United States Patent
Takada

[19]

[11] Patent Number: 6,125,532
[45] Date of Patent: *Oct. 3, 2000

[54] METHOD FOR MANUFACTURING WIRE HARNESS

[75] Inventor: Kazuhiko Takada, Shizuoka, Japan

[73] Assignee: Yazaki Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/040,362

[22] Filed: Mar. 18, 1998

[30] Foreign Application Priority Data

Mar. 19, 1997 [JP] Japan ..................... 9-066236

[51] Int. Cl.⁷ .................................................. H01R 43/00
[52] U.S. Cl. ............................... 29/857; 29/861; 29/863; 29/749; 29/748; 29/33 M
[58] Field of Search ............................ 29/857, 861, 863, 29/866, 755, 33 M, 33 F, 748, 749, 751; 439/625

[56] References Cited

U.S. PATENT DOCUMENTS

| | | | |
|---|---|---|---|
| 4,110,880 | 9/1978 | Peppler et al. | 29/33 K |
| 4,433,479 | 2/1984 | Suzuki et al. | 29/825 |
| 4,570,326 | 2/1986 | Meyer et al. | 29/566.3 |
| 4,581,796 | 4/1986 | Fukuda et al. | 29/33 M |
| 4,646,404 | 3/1987 | Matsui | 29/33 M |
| 4,677,734 | 7/1987 | Block et al. | 29/564.2 |
| 4,803,778 | 2/1989 | Cross | 29/857 |
| 4,908,941 | 3/1990 | Fukuda et al. | 29/857 |
| 5,074,038 | 12/1991 | Fath | 29/861 |
| 5,522,436 | 6/1996 | Tabuchi et al. | 140/92.1 |
| 5,535,788 | 7/1996 | Mori et al. | 140/92.1 |
| 5,575,058 | 11/1996 | Nakamura et al. | 29/748 |
| 5,659,949 | 8/1997 | Ohba et al. | 29/753 |
| 5,709,027 | 1/1998 | Kato et al. | 29/861 |
| 5,745,975 | 5/1998 | Heisner et al. | 29/564.6 |
| 5,878,489 | 3/1999 | Shioda et al. | 29/857 |
| 5,894,660 | 4/1999 | Kobayashi et al. | 29/857 |

FOREIGN PATENT DOCUMENTS

| | | | |
|---|---|---|---|
| 6-188055 | 7/1994 | Japan | 29/857 |
| 7-161439 | 6/1995 | Japan . | |
| 7-296933 | 11/1995 | Japan . | |
| 9-50720 | 2/1997 | Japan . | |

*Primary Examiner*—Carl J. Arbes
*Assistant Examiner*—Minh Trinh
*Attorney, Agent, or Firm*—Armstrong, Westerman, Hattori, McLeland & Naughton

[57] ABSTRACT

A wire harness manufacturing method are provided. The pressure welding device for wiring includes a pressure welding unit for pressure-welding wires to connectors and a wiring plate provided with wiring fittings and placed in a position toward which the wires are pulled from the pressure welding unit. The wiring plate and the pressure welding unit are movable in a wire pulling direction. Wires are pressure-welded to one connector by the pressure welding unit. As the connector is pulled toward the wiring plate so as to hook the wires by predetermined wiring fittings. The wires are then pressure-welded to the other connector. After the wires are pressure-welded to the other connector, a continuity test of the wire harness is conducted on the wiring plate. After the wiring, the wiring plate and the pressure welding unit are moved in a wire pulling direction so as to eliminate the slack of the wires.

5 Claims, 12 Drawing Sheets

METHOD FOR MANUFACTURING WIRE HARNESS

BACKGROUND OF THE INVENTION

1. Field of the Invention

The present invention relates to a pressure welding device for wiring and a wire harness manufacturing method for manufacturing a wire harness by integrally performing pressure welding and wiring.

2. Related Art

FIGS. 8 to 12 show a conventional wire harness manufacturing method.

Figure 8:
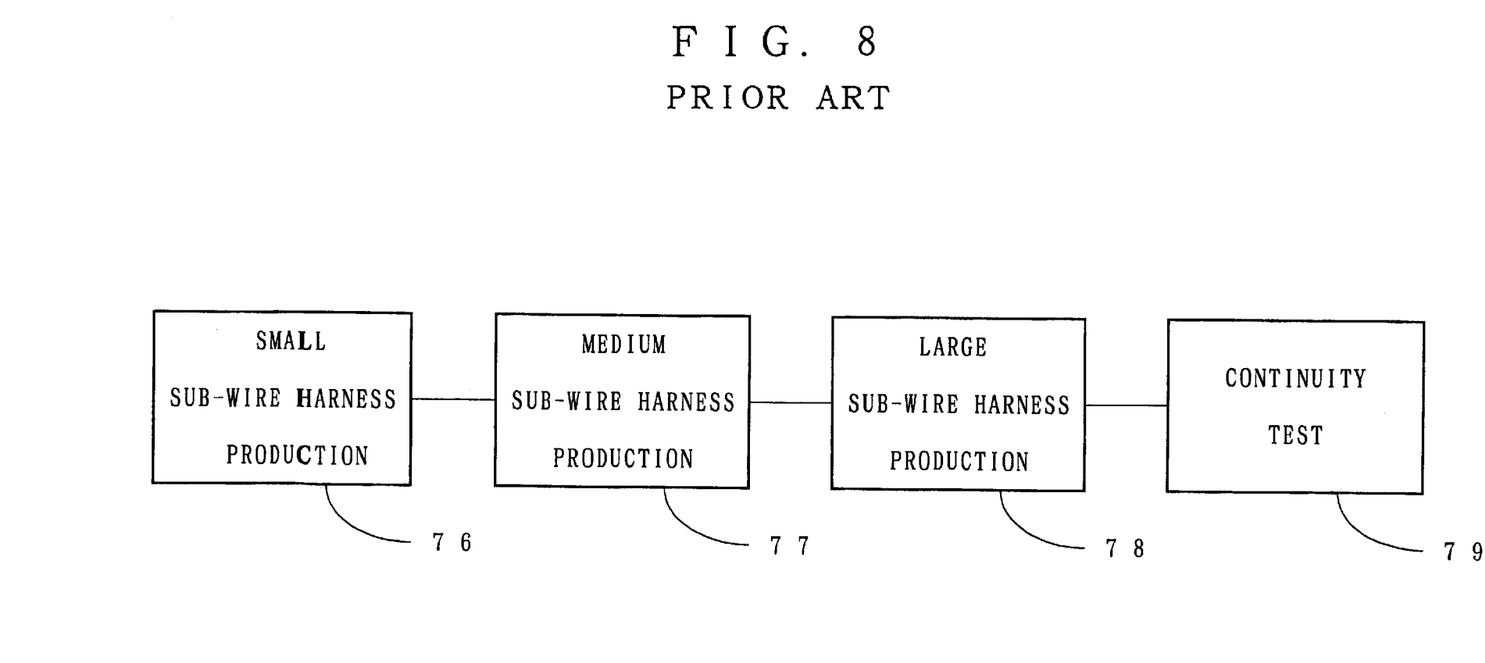
FIG. 8 illustrates a wire harness manufacturing method of the prior art.
Figure 9A:
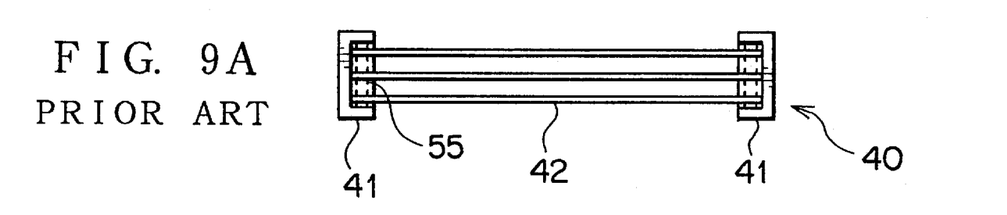
FIGS. 9A to 9D are plan views each showing a small sub-wire harness.
Figure 9B:
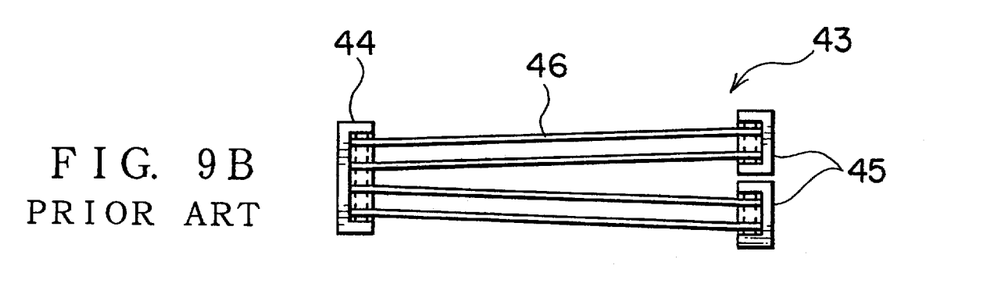
Figure 9C:
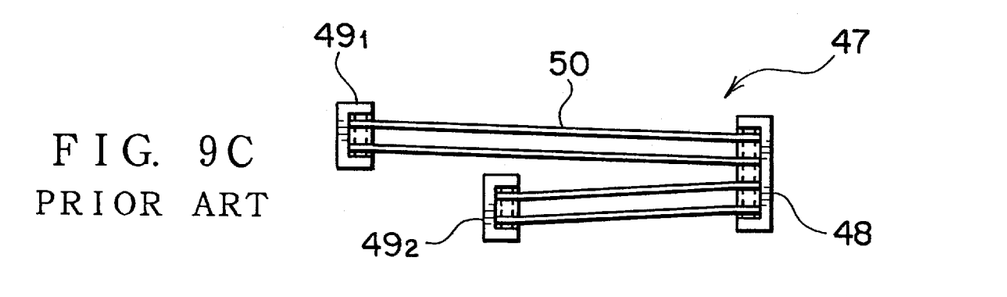
Figure 9D:
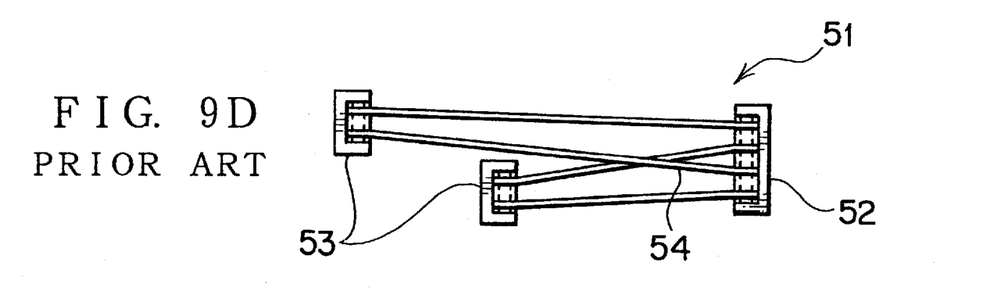
Figure 10:
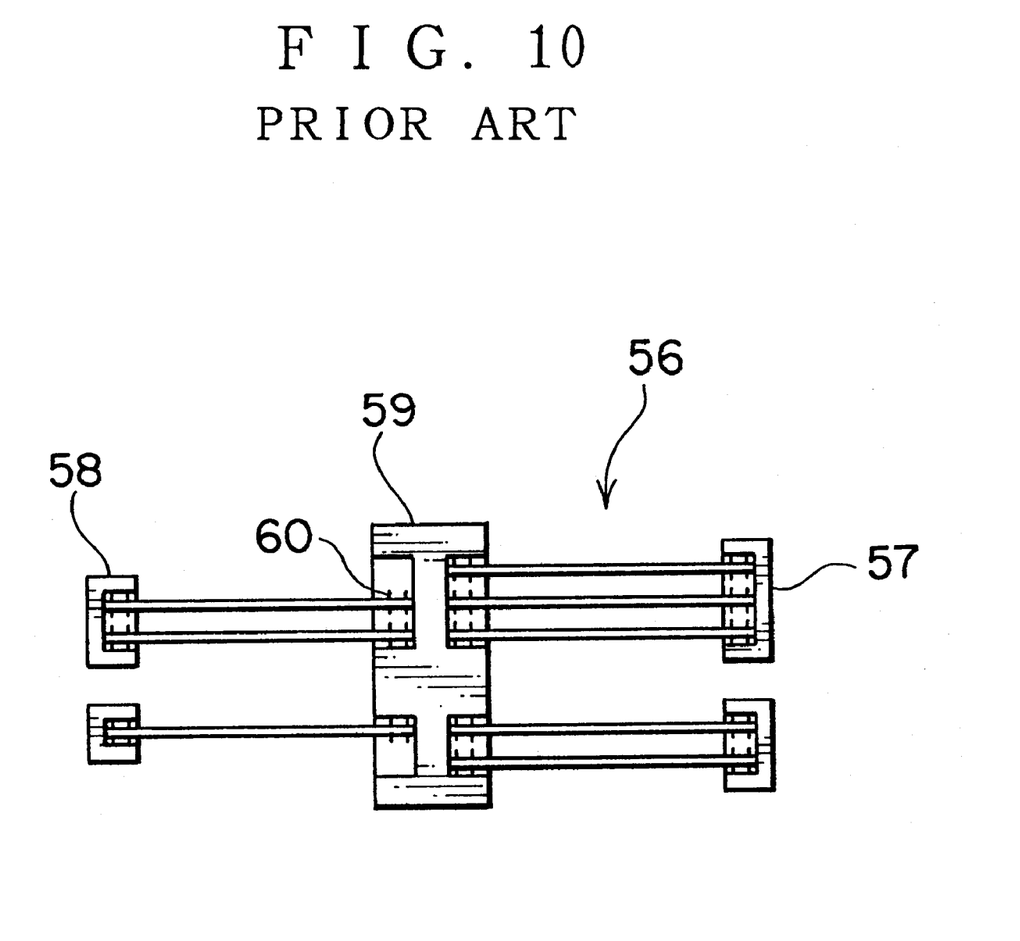
FIG. 10 is a plan view of a medium sub-wire harness.

In this method, small sub-wire harnesses 40, 43, 47, and 51 are provided as shown in FIGS. 9A to 9D, and a medium sub-wire harness 56 is also provided as shown in FIG. 10 (see steps 76 and 77 of FIG. 8).

The small sub-wire harness 40 shown in FIG. 9A is formed by pressure-welding wires 42 to two identical connectors 41. Each connector 41 is provided with a pressure welding terminal 55. The small sub-wire harness (a multi-parallel wire harness) 43 shown in FIG. 9B is formed by pressure-welding wires 46 of the same length to a long connector 45 and two short connectors 45. The small sub-wire harness 47 shown in FIG. 9C is formed by pressure-welding wires 50 of different lengths to a long connector 48 to two short connectors 49 ($49_1$ and $49_2$). The small sub-wire harness (a random harness) 51 shown in FIG. 9D is formed by pressure-welding crossed wires 54 to a long connector 52 and two short connectors 53.

The medium sub-wire harness 56 shown in FIG. 10 is formed by interposing an ECU (electronic control unit) 59 between connectors 57 and 58. The ECU 59 is equipped with a joint connector having pressure welding terminals 60.

Figure 11:
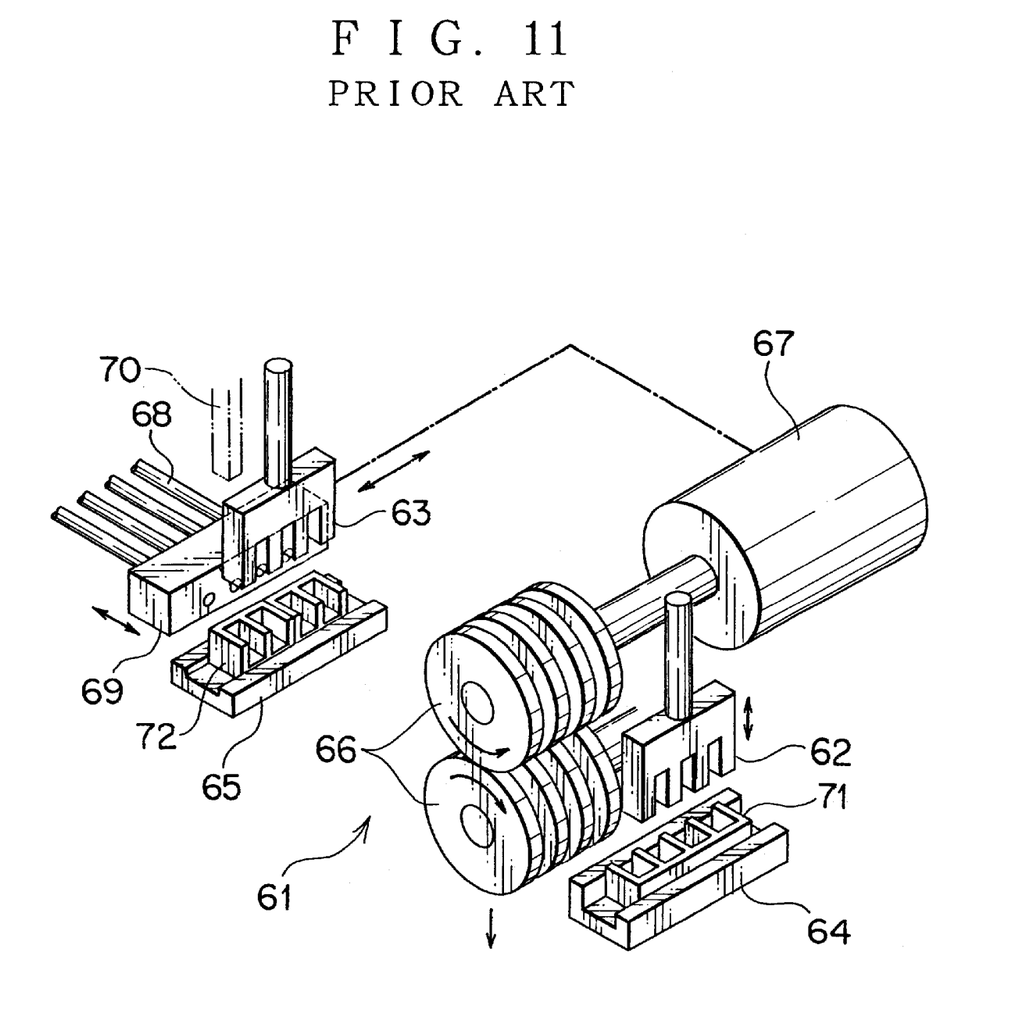
FIG. 11 is a perspective view of a pressure welding unit of the prior art.

The small sub-wire harnesses 40, 43, 47, and 51, and the medium sub-wire harness 56 are manufactured using a pressure welding unit 61 shown in FIG. 11. This pressure welding unit 61 is disclosed in Japanese Patent Application Laid-Open No. 6-31198 filed by the present applicant. The pressure welding unit 61 is provided with comb-like pressure welding blades 62 and 63 which are separately situated in the wire pulling direction, connector tables 64 and 65 which are situated below the respective pressure welding blades 62 and 63, and a pair of measurement rollers 66 interposed between the connector tables 64 and The measurement rollers 66 and the rear-side pressure welding blade 63 are movable in the transverse direction. The measurement rollers 66 are rotated by a motor 67. Wires 68 are held by a feeding head 69 and fed to the connector tables 64 and 65. The feeding head 69 can move back and forth by virtue of a cylinder (not shown). The measurement rollers 66 may be positioned behind the connector table 65, and each pressure welding blade may take the form of a tooth as indicated by reference numeral 70 in FIG. 11, instead of the form of a comb.

With the pressure welding unit 61, the wires 68 are pressure-welded to a connector 71 placed on the front-side connector table 64. The connector 71 is then removed from the connector table 64, and as the wires 68 are measured for a predetermined length by the measurement rollers 66, the connector 71 is sent forward so as to pressure-weld the wires 68 to a connector 72 placed on the rear-side connector table 65.

The small sub-wire harness 47 shown in FIG. 9C is manufactured in the following manner. The short connectors 49 are set to the front-side connector table 64. Wires 50 (68) are pressure-welded to the short connector $49_1$, and subjected to measurement. The measurement rollers 66 are then moved in the transverse direction so as to pressure-weld the wires 50 (68) to the other short connector $49_2$. The small sub-wire harness 51 is manufactured using the single-tooth pressure welding blade 70 and moving the connector table 65 in the transverse direction.

Figure 12:
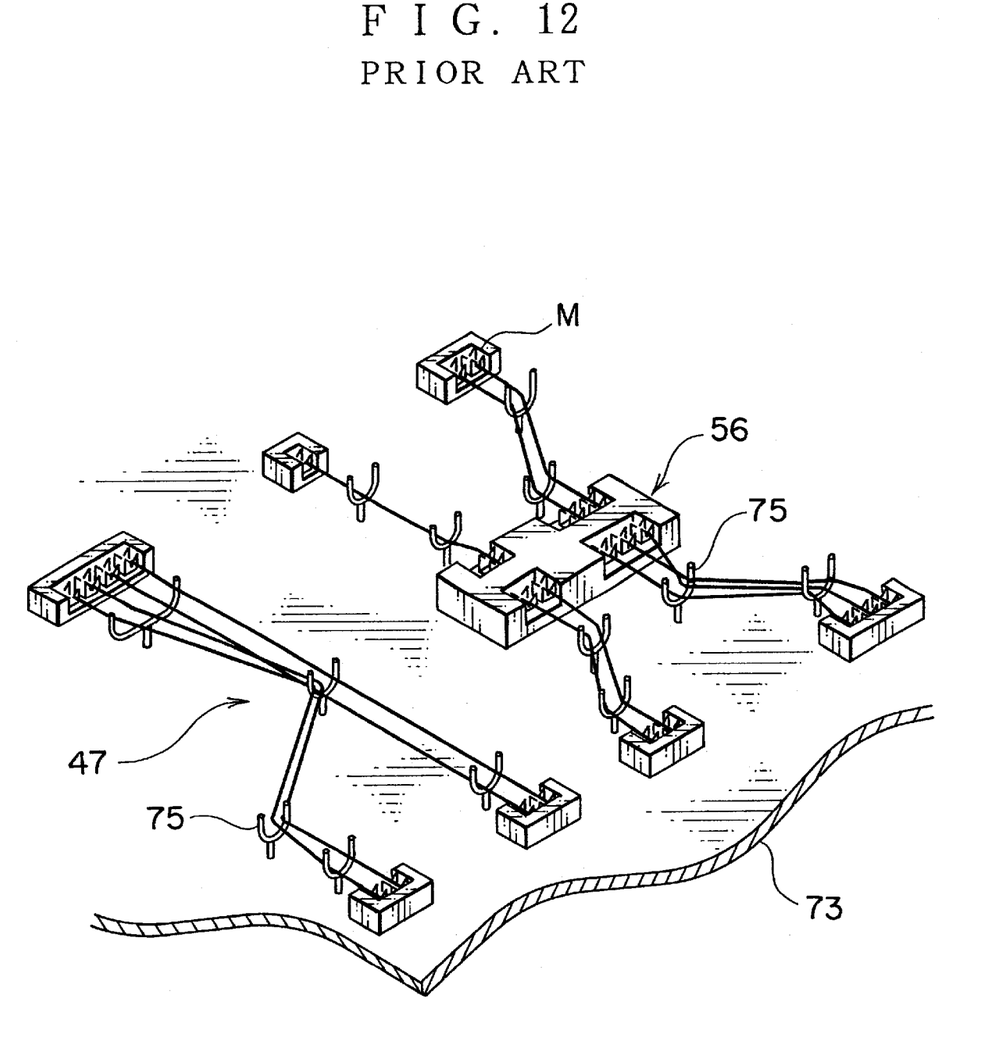
FIG. 12 is a perspective view of a wired large sub-wire harness.

The small sub-wire harnesses 40, 43, 47, and 51, and the medium sub-wire harness 56 are assembled on a wiring plate 73 and formed into a large sub-wire harness. The wiring plate 73 is provided with fork-like wiring fittings 75 standing at predetermined positions. The small sub-wire harness 47 and the medium sub-wire harness 56 are hooked by the wiring fittings 75 so as to form a wire harness. A continuity test is then conducted with a continuity checker (not shown) as in step 79 of FIG. 8. After the remaining necessary processes such as taping, a wire harness is finally completed.

With the above conventional wire harness manufacturing method, however, there is a problem that many processes are necessary because small sub-wire harnesses and a medium wire-harness are manufactured using a pressure welding unit, and then a large sub-wire harness is manufactured using a wiring plate.

SUMMARY OF THE INVENTION

The principal object of the present invention is to provide a wire harness manufacturing device for manufacturing a wire harness in a small number of steps.

To achieve the above object, the present invention provides a pressure welding device for wiring which comprises a pressure welding unit for pressure-welding wires to connectors, and a wiring plate provided with wiring fittings. The wiring plate is placed in a position toward which the wires are pulled from the pressure welding unit. The wiring plate and the pressure welding unit are movable in the wire pulling direction.

To achieve the above object of the present invention, a wire harness manufacturing method is also provided. In this method, the wires are first connected to a connector by the pressure welding unit. As the connector is pulled toward the wiring plate, the wires are hooked by the predetermined wiring fittings on the wiring plate to form a wire harness structure. The wires are then pressure-welded to the other connector by the pressure welding unit. After the wires are welded to the first connector, the mid-section of the wires may be pressure-welded to an electronic unit by the pressure welding unit. In such case, the wires are pressure-welded to the front and rear portions of the electronic unit by the front and rear pressure welding blades simultaneously. The wires are then cut with a cutter provided between the front and rear pressure welding blades. After the wires are pressure-welded to the second connector, a continuity test of the wire harness is conducted on the wiring plate. After the wiring, the wiring plate and the pressure welding unit are moved in the wire pulling direction so as to eliminate the slack of the wires.

The above and other objects and features of the present invention will be more apparent from the following description taken in conjunction with the accompanying drawings.

DESCRIPTION OF THE PREFERRED EMBODIMENTS

The following is a detailed description of embodiments of the present invention, with reference to the accompanying drawings.

Figure 1:
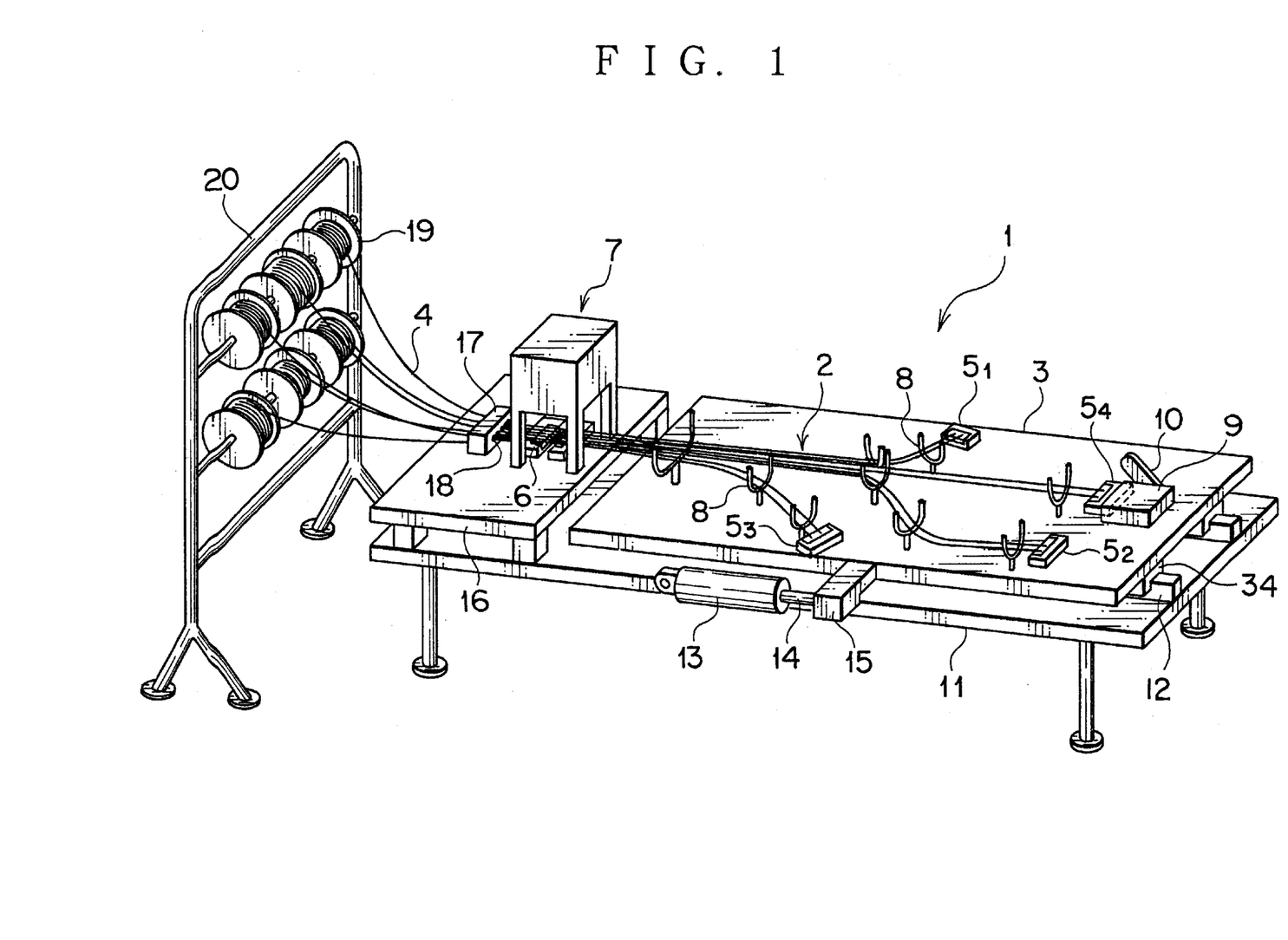
FIG. 1 is a perspective view of an embodiment of the pressure welding device for wiring of the present invention.

FIG. 1 illustrates an embodiment of the pressure welding device of wiring of the present invention.

The pressure welding device 1 for wiring is integrally provided with a wiring plate 3 for wiring a wire harness 2 (a large sub-wire harness), and a pressure welding unit 7 for pressure-welding wires 4 which constitute the wire harness 2 to connectors 5 ($5_1$ to $5_4$) and 6.

On the wiring plate 3, a plurality of fork-like wiring fittings 8 and a continuity checker 9 are provided where necessary. The positions of the wiring fittings 8 and the continuity checker are changed or the wiring plate 3 itself is replaced depending on the shape of the wire harness 2. The continuity checker is designed to secure a connector 5 by rotating a lever 10. The wiring fittings 8 do not necessarily hook the wires, but they may fasten the wires together.

The wiring plate 3 is provided slidably back and forth on a base table 11 in the wire pulling direction. The wiring plate 3 is placed on rails 12 and sliders 34 provided on the base table 11. The base table 11 is horizontally provided with an air cylinder 13. A rod 14 of the air cylinder 13 is connected to the wiring plate 3 via a bracket 15.

A substrate 16 on which the pressure welding unit 7 is placed is secured on the rear side of the base table 11. The substrate 16 is situated at the same height as the wiring plate 3. A wire guide 17 is provided in the vicinity of the back of the pressure welding unit 7. The wire guide 17 is provided with a plurality of guide holes in parallel. At the rear side of the wire guide 17, a plurality of wire reels 19 are hung on a support stand 20.

The measurement rollers 66 and the motor 67 of the pressure welding unit 61 of the prior art (shown in FIG. 11) are not necessary for the pressure welding unit 7 of this embodiment. Comb-like or single-tooth pressure welding blades are suitably used depending on the shape of the wire harness. The comb-like pressure welding blades 62 and 63 form a multi-parallel wire harness, while the single-tooth pressure welding blade 70 forms a random wire harness.

The pressure welding unit employed in this embodiment may be the random wire harness pressure welding device disclosed in Japanese Patent Application No. 5-307858, or the pressure welding device (described more fully below) disclosed in Japanese Patent Application No. 7-203343, both of which were filed by the present applicant.

In FIG. 1, the wiring plate 3 is made movable back and forth so that it can be moved forward to eliminate the slack of the wire harness 2 after the wiring. The substrate 16 may be made movable instead, with the wiring plate 3 being secured onto the base table 11. Such movable mechanism is disclosed in Japanese Patent Application No. 7-203343.

FIGS. 2 to 5 illustrate a wire harness manufacturing method in which the pressure welding device 1 for wiring is used.

Figure 2:
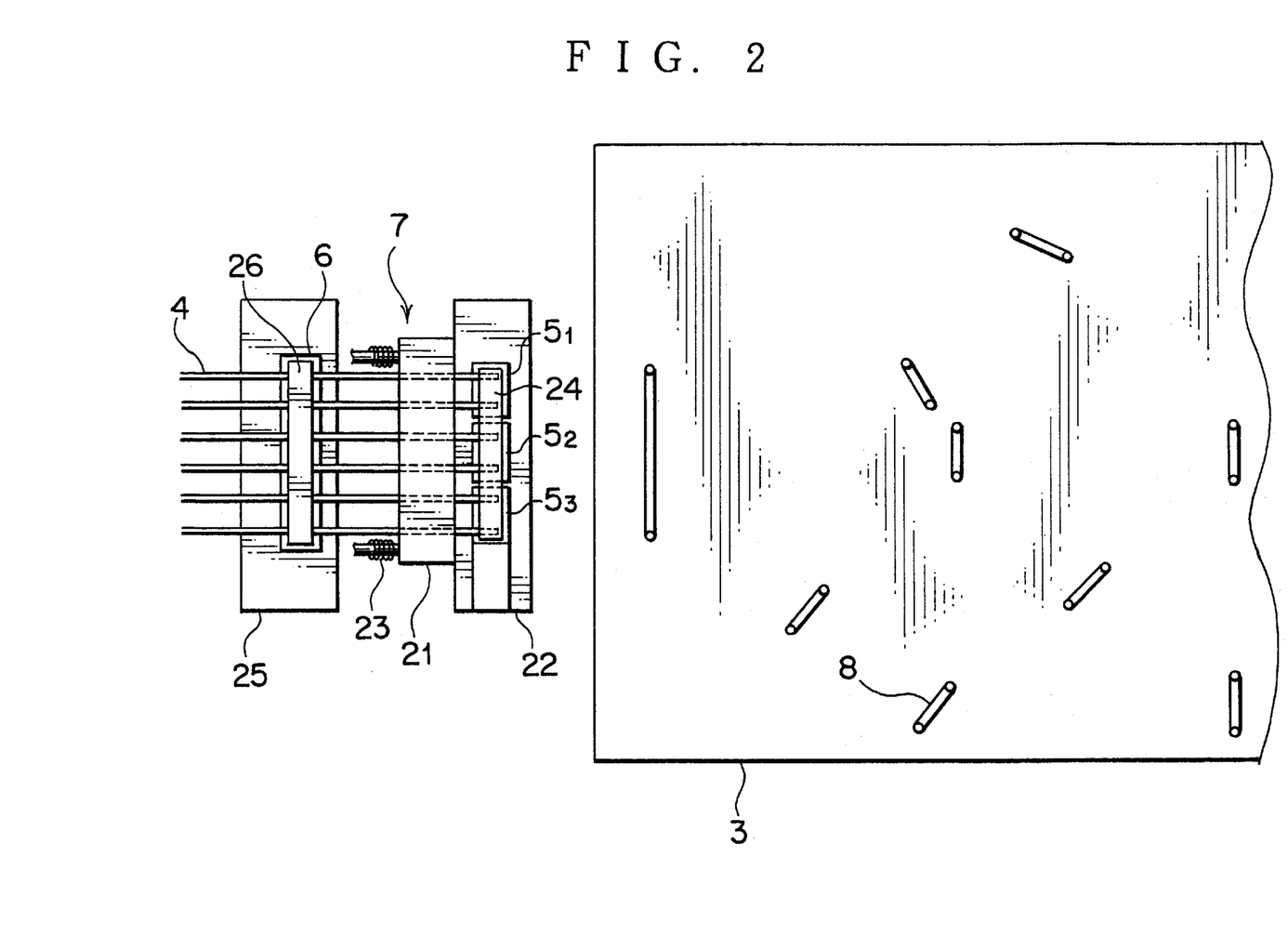
FIG. 2 is a plan view illustrating a process of a wire harness manufacturing method in which the pressure welding device for wiring.

Firstly, a wire feeding head 21 of the pressure welding unit 7 is brought into contact with a front-side first table 22, so that the edge portions 4a of the wires 4 can be positioned above the respective connectors $5_1$ to $5_3$ on the first table 22. If using the connector $5_4$, the connectors 5 are arranged in parallel on the first table 22. The wire feeding head 21 presses springs 23, and is brought into contact with the first table 22, so that the edge portions 4a of the wires 4 will protrude forward. As the wire feeding head 21 moves forward, the wires 4 are secured to the wire feeding head 21 with a brake (not shown). Upon contact with the first table 22, the brake is released to make the wires 4 movable. Such mechanism is disclosed in Japanese Patent Application No. 6-31198.

Figure 3:
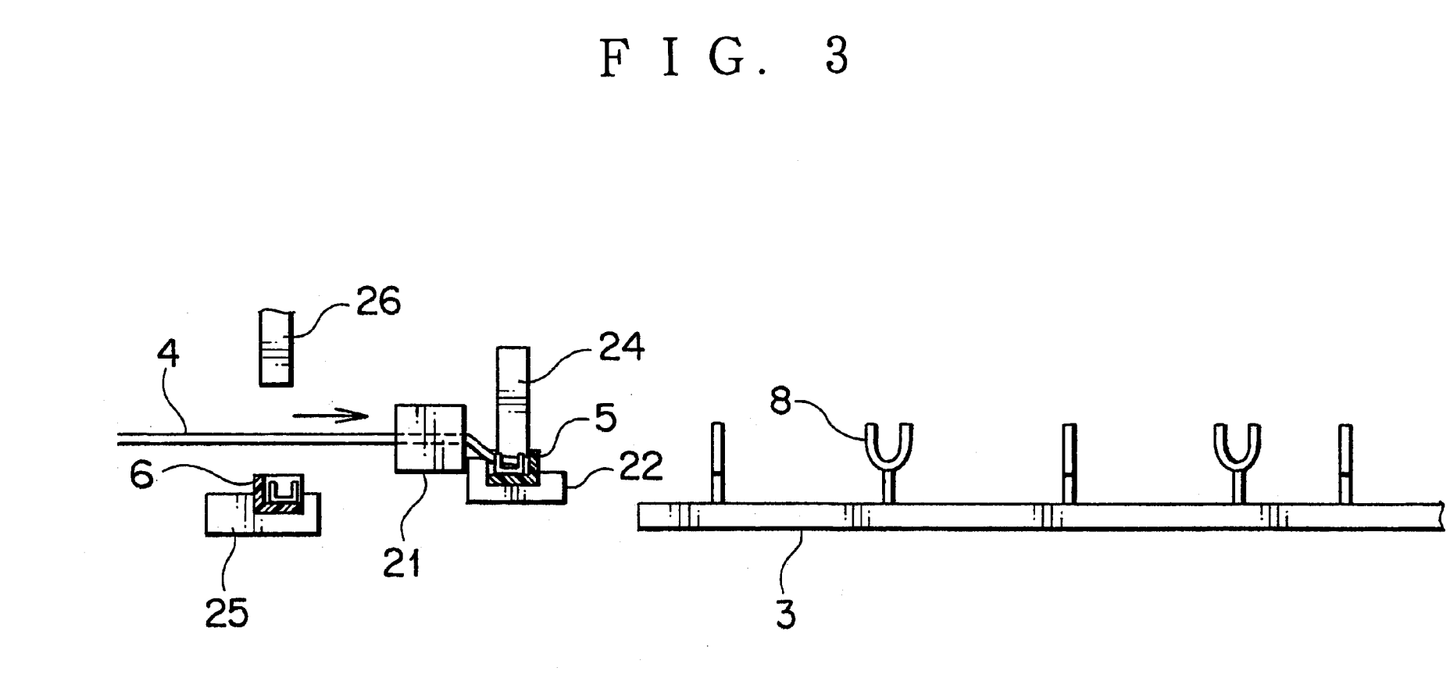
FIG. 3 is a side view illustrating how a connector is pressure-welded to one connector.

A front-side first pressure welding blade 24 is lowered to pressure-weld the wires 4 to the connectors 5. The number of connectors 5 varies depending on the shape of the wire harness 2 (shown in FIG. 1). The rear-side second table 25 is also provided with a connector 6. The rear-side second pressure welding blade 26 is situated on the second table 25, and yet to pressure-weld the wires 4 to the connector 6. The wiring plate 3 is provided with various fork-like wiring fittings 8 where necessary.

Figure 4:
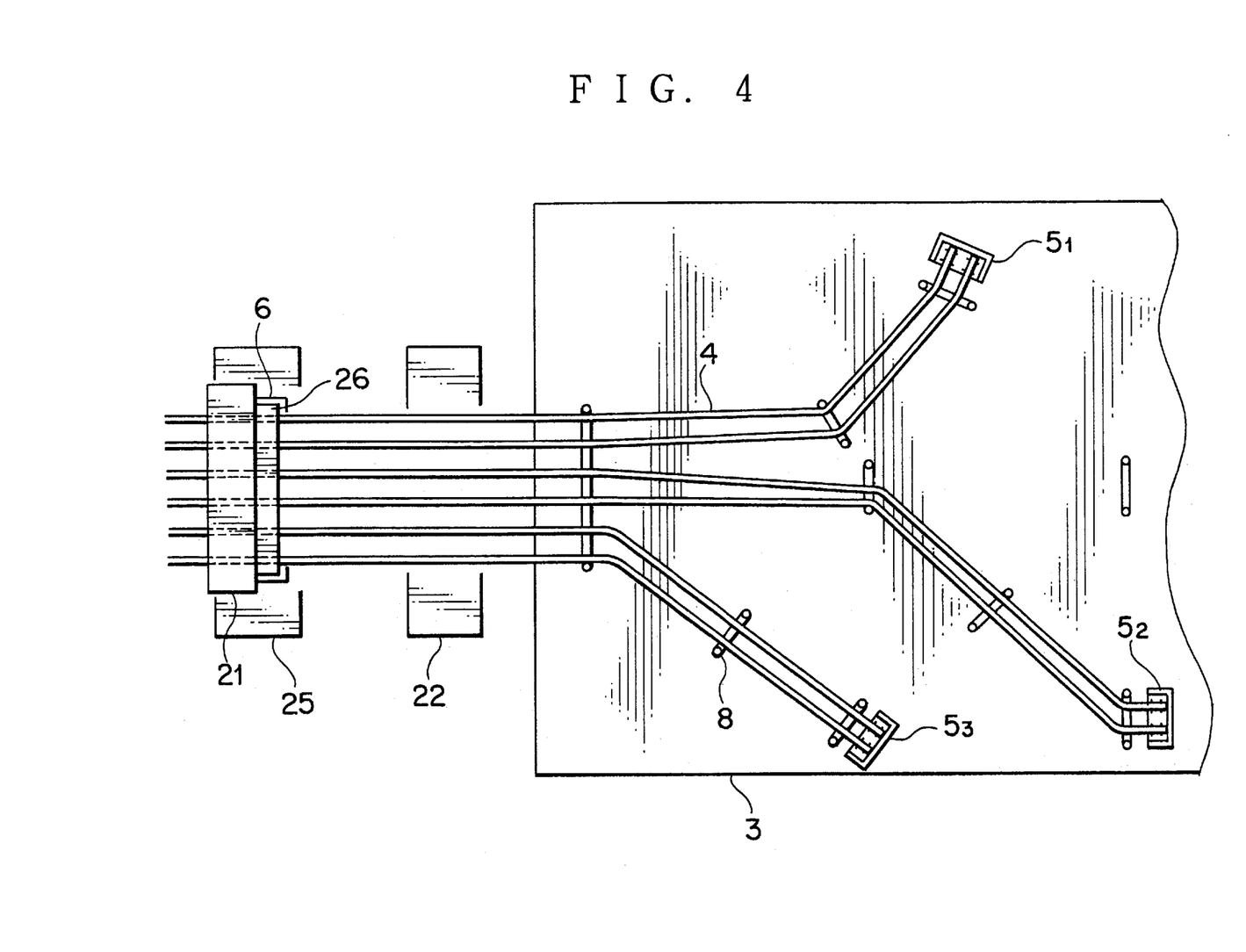
FIG. 4 is a plan view illustrating how wiring is performed.

As shown in FIG. 4, the connectors $5_1$ to $5_3$ on the front-side table 22 are picked up by hand and pulled forward one by one, and the wires 4 are hooked by the predetermined wiring fittings 8 on the wiring plate 3 so that the connectors $5_1$ to $5_3$ can be hooked and secured by the predetermined wiring fittings. Thus, measurement and wiring of the wires 4 can be performed at the same time. Furthermore, the wiring plate 3 is moved slightly forward in the direction of the arrow A (shown in FIG. 5) by virtue of the air cylinder (shown in FIG. 1), so as to pull the wires 4 to eliminate the slack. The length of the wires 4 is adjusted so that it can be a predetermined length when the wiring plate 3 is moved.

Figure 5:
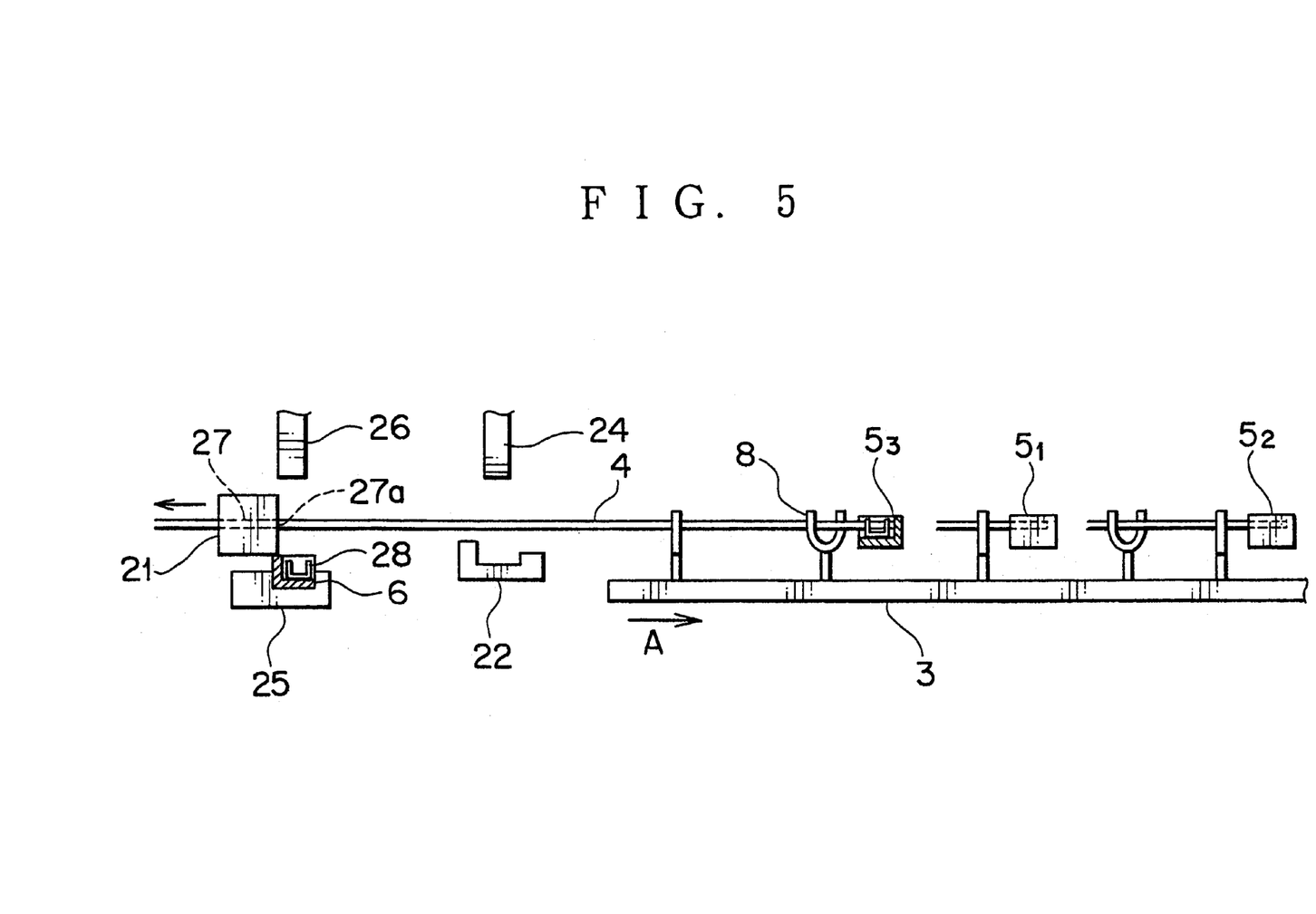
FIG. 5 is a side view illustrating how a wire is pressure-welded to the other connector.

The wire feeding head 21 relatively moves backward and stays on the second table 25. As shown in FIG. 5, the second pressure welding blade 26 then pressure-welds the wires 4 to the connector 6 on the second table 25. As the pressure welding blade 26 is lowered, the wires 4 are cut on edges 27a of insertion holes 27 of the wire feeding head 21, and pressure-welded to the pressure welding terminal 28 inside the connector 6. The pressure welding of the wires 4 corresponds to the forming of the small sub-wire harnesses in the prior art. Thus, small sub-wire harnesses and the wire harness 2 shown in FIG. 1 are formed at the same time.

The medium sub-wire harness 56 shown in FIG. 10 is produced in the following manner. The wires 4 are pressure-welded to the connector 57 (also shown in FIG. 10) on the front-side table 22. The connector 57 is then moved forward by hand, so that the wires 4 can be pressure-welded to the front portion of the ECU (electronic control unit) 59 provided on the rear-side table 25. After that, the ECU 59 is moved toward the front-side table 22 so as to pressure-weld the wires 4 to the rear portion of the ECU 59. The ECU 59 is then moved forward so that the wires 4 can be pressure-welded to the other connector 58 on the rear-side table 59. By supporting the wires 4 with the wiring fittings 8 upon moving the connector 57 and the ECU 59, the medium sub-wire harness as shown in FIG. 12 can be completed.

After a connector 5 on the wiring plate 3 is set to the continuity checker 9, the wire 4 are pressure-welded to the connector 6 on the side of the second table 25. At the same time of the pressure welding, the connector 6 on the side of the second table 25 is set to the continuity checker 9 so as to conduct a continuity test of the wire harness 2. A continuity checker of a structure shown in FIG. 6 (disclosed in Japanese Patent Application No. 7-15744) can be employed in this embodiment.

Figure 6:
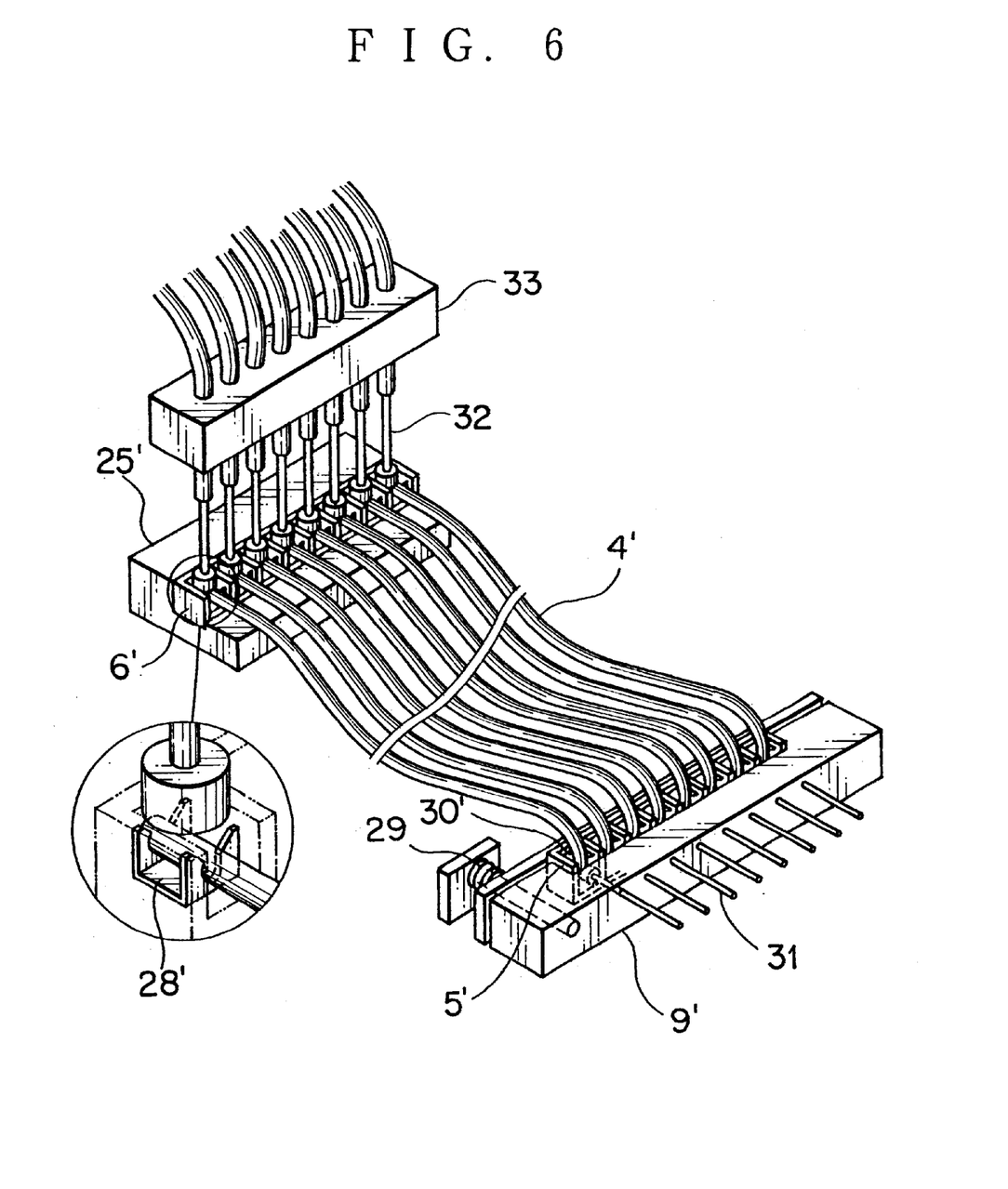
FIG. 6 is a perspective view of an example continuity test of a wire harness.

In FIG. 6, a front-side connector 5' is fixed inside a continuity checker 9' by virtue of a spring 29, and probe pins 31 are in contact with pressure welding terminals 30' in the connector 5'. A rear-side connector 6' is placed on a table 25', and a continuity checker 33 is lowered from above the connector 6' to bring the probe pins 32 into contact with pressure welding terminals 28'. Thus, the wires 4' of this wire harness are tested for continuity.

After the continuity test, the wire harness 2 is taped and provided with a protector or the like, so that a wire harness can be completed as a product.

Figure 7:
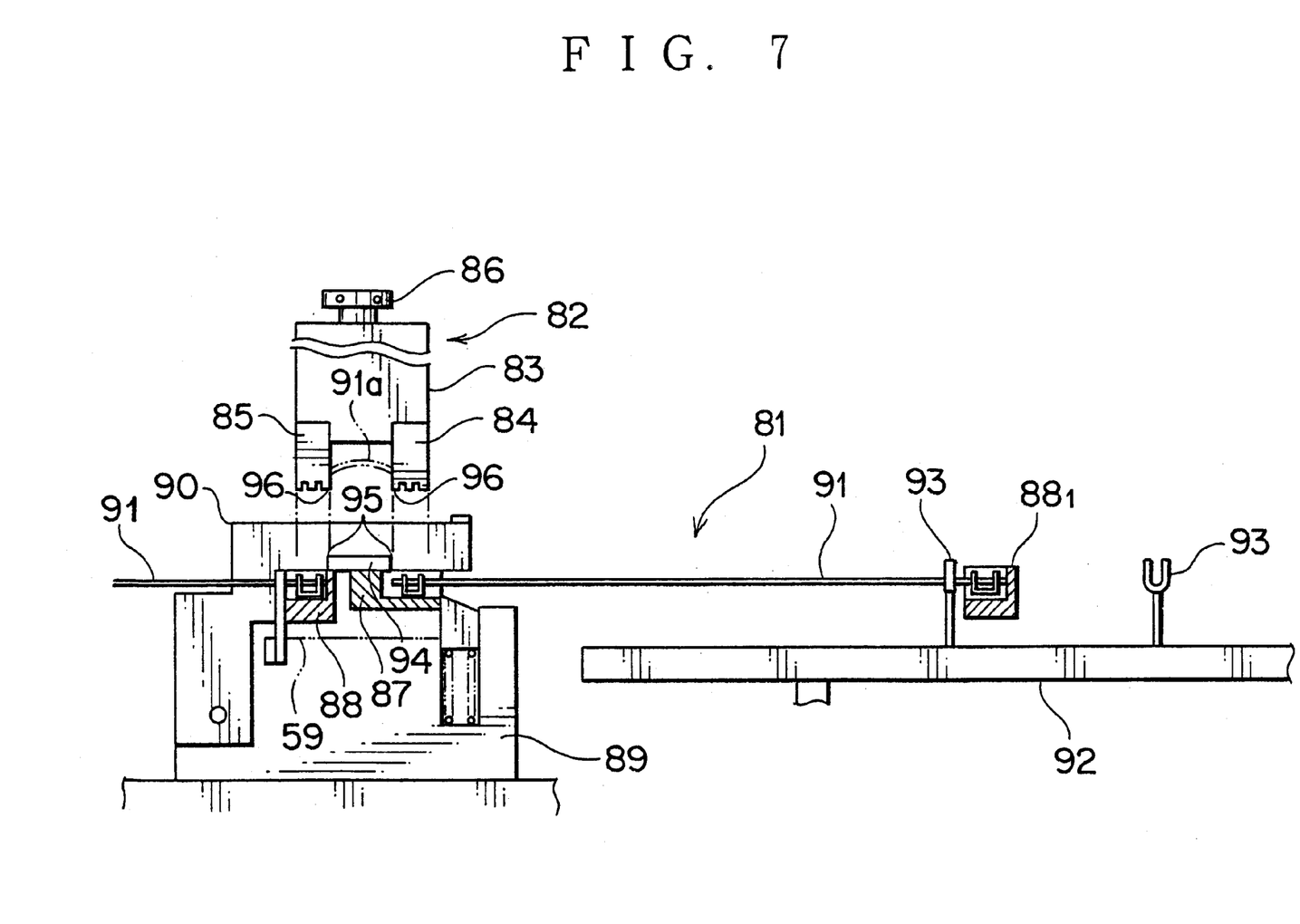
FIG. 7 is a side view of another embodiment of the pressure-welding device for wiring.

FIG. 7 shows another embodiment of the pressure welding device for wiring of the present invention.

In this pressure welding device 81 for wiring, a pressure welding unit 82 disclosed in Japanese Patent Application No. 7-203343 filed by the present applicant. This pressure welding unit 82 is integrally provided with an applicator 83 having front-side and rear-side pressure welding blades. A shank 36 is grabbed and moved up and down by an elevating cylinder so that the front-and rear-side pressure welding blades 84 and 85 can go up and down simultaneously.

Connectors 87 and 88 are set on both front and rear sides of a table 89, and secured by an open-close cover 90 having comb-like slits. The slits are designed to receive the pressure welding blades 84 and 85 for wires 91.

A wiring plate 92 is provided in front of the pressure welding unit 82. The wiring plate 92 also has wiring fittings 93 as in the previous embodiment. The wiring plate 92 and the table 89 are slightly movable in the horizontal direction by virtue of a cylinder (not shown).

The following is an explanation of a wire harness manufacturing method in which the above pressure welding device 81 for wiring is employed.

Firstly, the wires 91 are pressure-welded to the rear-side connector 88 by the pressure welding unit 82. Here, the front-side connector 87 is yet to be set and remains unoccupied. The cover 90 is then opened, and the rear-side connector 88 is moved to the wiring plate 92 by hand or with an automatic arm. Thus, the connector 88 is set to the predetermined wiring fittings 93. As the connector $88_1$ moves, the wires 91 are pulled.

The connectors 87 and 88 are set on the front and rear sides of the table 89. The wires 91 are then simultaneously pressure-welded to the connectors 87 and 88 by the pressure welding blades 84 and 85. A wire 91a between the connectors 87 and 88 is cut by a cutter 94 and edges 95 and 96 of the respective pressure welding blades 84 and 85, as shown by the broken line in FIG. 7. At this point, a small sub-wire harness is formed between the a connector $88_1$ and the connector 87 on the front side of the table 89. The front-side connector 87 is then removed from the table 89 and held by a temporary holder (not shown), while the rear-side connector 88 is moved on the wiring plate 92 as described above. By repeating this procedure, a wire harness of a predetermined wired structure can be obtained. Finally, the slack of the wires 91 is eliminated by slightly moving the wiring plate 92 and the table 89.

By using the pressure welding device 81 for wiring, a medium sub-wire harness (shown in FIGS. 10 and 12) can be easily formed. More specifically, the rear-side connector, to which the wires 91 are pressure-welded as in FIG. 7, is moved to the wiring plate 92 (to the position of the connector $88_1$) and temporarily held by a temporary wiring fitting, and then the ECP (electronic control unit) 59 is set to the table 89 as indicated by the broken line. The distance between the temporary fitting and the table 89 is adjusted to the predetermined wire length. The connectors 87 and 88 are set on the front and rear sides of the ECU 59. One movement of the applicator 83 can connect the wires 91 to the front and rear connectors 87 and 88 simultaneously. The wires 91 are cut as indicated by the broken line 91a.

The ECU 59 is then removed from the table 89 and moved to the wiring plate 92, where it is set to the predetermined wiring fitting 93. At this point, the temporarily held connector $88_1$ is also set to the predetermined wiring fitting 93. The connector 88 is then set on the rear side of the table 89 to pressure-weld the wire 91. By doing so, a medium sub-wire harness can be completed.

As described so far, according to the present invention, only one step is required for feeding wires, pressure-welding the wires to one connector, measuring the wires, and pressure-welding the wires to the other connector. In one embodiment of the present invention, there is no need to perform wiring in a separate step after forming a small sub-wire harnesses and a medium sub-wire harness as in the prior art. Thus, the number of steps required in manufacturing a wire harness can be reduced, and as a result of this, productivity can be dramatically improved. In another embodiment of the present invention, the wiring of a wire harness and a continuity test can be conducted at the same time, thereby improving productivity. In yet another embodiment, the length of the wires are precisely adjusted so as to improve measurement accuracy for wire harnesses. In still another embodiment of the present invention, wiring and pressure welding of a medium sub-wire harness provided with an electronic unit can be performed in one step, and such medium sub-wire harness can be easily and efficiently formed.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A wire harness manufacturing method comprising, in the described order, the steps of:

providing a pressure welding unit;

setting, at a location adjacent to said pressure welding unit, a wiring plate having at least one wiring fitting thereon;

pressure-welding a plurality of wires to a first connector by said pressure welding unit;

pulling said first connector with said plurality of wires toward a wiring plate;

supporting and guiding said wires on said wiring fitting so as to form a structure of a wire harness; and pressure-welding said wires to a second connector by said pressure welding unit while said wires are forming said wire harness structure.

2. The wire harness manufacturing method according to claim 1, further comprising the step of pressure-welding the mid section of said wires to an electronic unit by said pressure welding unit, after said wires are pressure-welded to said first connector.

3. The wire harness manufacturing method according to claim 2, further comprising the steps of:

pressure-welding said wires to the front and rear portions of said electronic unit simultaneously by front and rear pressure welding blades provided for said pressure welding unit; and cutting said wires with a cutter blade provided between said front and rear pressure welding blade.

4. The wire harness manufacturing method according to any of claims 1 to 3, further comprising the step of conducting a continuity test of pressure-welded portions of a wire harness on said wiring plate, after said wires of the wire harness are pressure-welded to said second connector.

5. The wire harness manufacturing method according to any of claims 1 to 3, further comprising the step of:

moving said wiring plate and/or said pressure welding unit in a direction where said wire is pulled after said step of supporting and guiding the wires on the wiring fittings.

* * * * *